W. C. MARSHALL.
Apparatus and Process for Rendering Lard.

No. 137,698. Patented April 8, 1873.

Witnesses:
E. J. Kastenhuber
Chas. Wahlers

Inventor:
William C. Marshall
Van Santvoord & Hauff
Attys

UNITED STATES PATENT OFFICE.

WILLIAM C. MARSHALL, OF NEW YORK, N. Y.

IMPROVEMENT IN APPARATUS AND PROCESSES FOR RENDERING LARD.

Specification forming part of Letters Patent No. 137,698, dated April 8, 1873; application filed January 21, 1873.

*To all whom it may concern:*

Be it known that I, WILLIAM C. MARSHALL, of the city, county, and State of New York, have invented a new and Improved Process for Rendering Lard and other Fats; and I do hereby declare the following to be a full, clear, and exact description thereof, which will enable those skilled in the art to make and use the same, reference being had to the accompanying drawing forming part of this specification, in which drawing—

Figure 1:
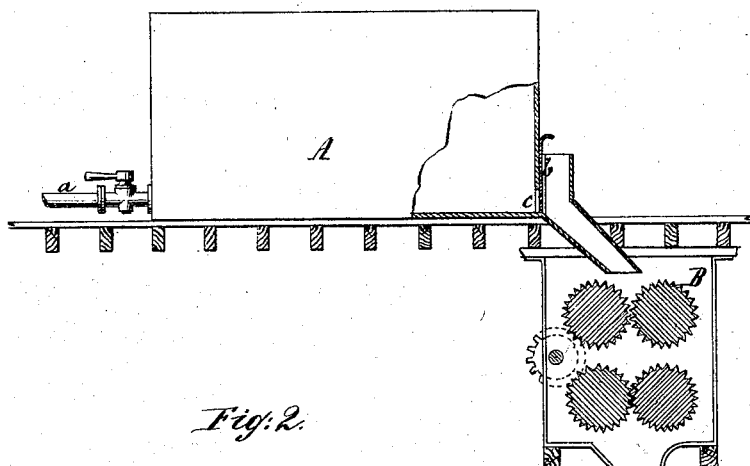
Figure 2:
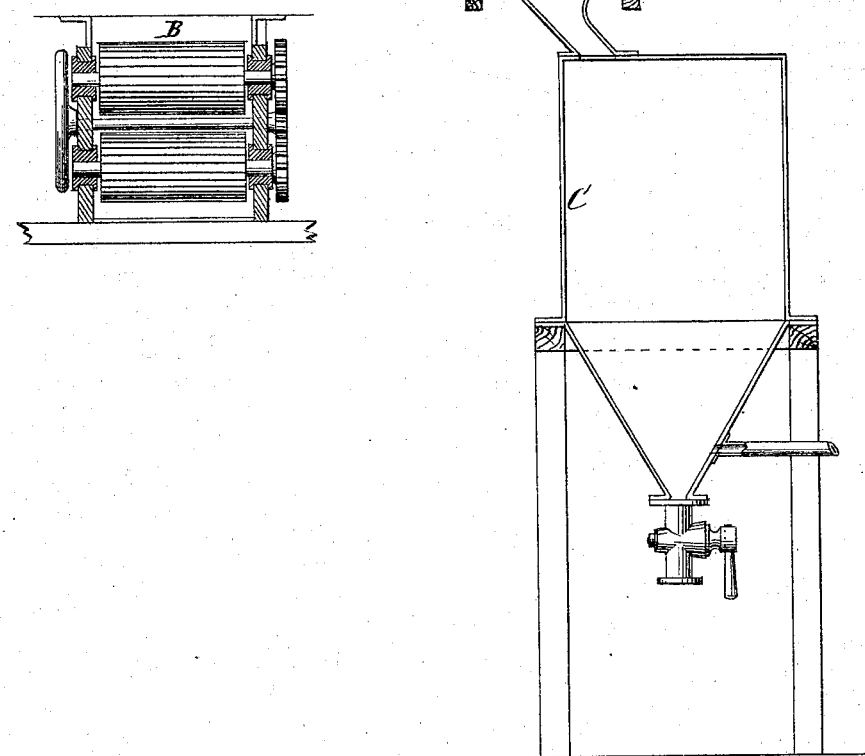

Figure 1 represents a sectional front view of the apparatus which I use in carrying out my process. Fig. 2 is a transverse section of the crusher which forms part of said apparatus, the line $x$ $x$, Fig. 1, indicating the plane of section.

Similar letters indicate corresponding parts.

This invention consists in first cooking the lard, then passing it through suitable crushers or cutters into the rendering-tank, where it is again heated in such a manner that by the first cooking operation the lard is reduced to a state in which it can easily be cut or crushed, and by these means the lard is carried to the rendering-tank cut up in comparatively small pieces, and the final rendering process is completed in a comparatively short time, and with great economy.

In the drawing, the letter A designates a tank of sheet metal or any suitable material, which is provided with a steam-pipe, $a$. This tank I fill partially with water; then I introduce the raw lard and cook it by admitting steam for about one hour. By this process the raw lard is rendered soft, and it can be easily cut or crushed. In the lower part of the tank A is a gate, $b$, and an opening, $c$, which leads to the crushing apparatus B. This apparatus consists, by preference, of two pairs of cutting-rollers arranged as shown in Fig. 2; but it may be constructed in any desirable manner. After having passed through the crushing apparatus the lard is conducted into the rendering-tank C, in which it is again heated by steam for about an hour, when the rendering process is complete.

By first cooking the raw lard I am enabled to cut it up into small pieces, and the final rendering process can be completed in less time and with less waste than it can by the ordinary process.

It must be remarked that fats of any description may be treated in the above-described manner, and by the use of the same apparatus, with equal success.

What I claim as new, and desire to secure by Letters Patent, is—

The within-described process for rendering lard by first cooking the raw lard, then passing it through a crushing or cutting apparatus into the rendering-tank, where the same is again cooked, substantially as set forth.

W. C. MARSHALL.

Witnesses:
 W. HAUFF,
 E. F. KASTENHUBER.